United States Patent [19]
Park et al.

[11] Patent Number: 5,748,356
[45] Date of Patent: May 5, 1998

[54] OPTICAL SCANNING APPARATUS

[75] Inventors: Chang Jin Park, Kyunggi-Do; Dong Hoon Kang; Chul Woo Lee, both of Seoul, all of Rep. of Korea

[73] Assignee: Samsung Electro-Mechanics Co., Ltd., Kyunggi-do, Rep. of Korea

[21] Appl. No.: 565,293

[22] Filed: Nov. 30, 1995

[30] Foreign Application Priority Data

Nov. 30, 1994 [KR] Rep. of Korea .................. 94 32729

[51] Int. Cl.$^6$ .................................................. G02B 26/08
[52] U.S. Cl. ........................... 359/207; 359/196; 359/206; 359/216; 347/259
[58] Field of Search .......................... 359/196, 197, 359/205–207, 216–219; 347/256, 258–261

[56] References Cited

U.S. PATENT DOCUMENTS 4,770,507 9/1988 Arimoto et al. .................. 359/218
4,962,982 10/1990 Takanashi .......................... 359/217

Primary Examiner—Paul M. Dzierzynski
Assistant Examiner—Darren E. Schuberg
Attorney, Agent, or Firm—Lowe, Price, LeBlanc & Becker

[57] ABSTRACT

An optical scanning apparatus has an F-θ function with one aspherical lens having a toric configuration that compensates for the vibration of a rotating polygon mirror. The optical scanning apparatus includes a laser diode as the source of light, a collimator lens, a compound prism, a rotating polygon mirror, and a scanning lens system. The compound prism is located between the rotating polygon mirror and the laser diode so that the laser diode and an optical axis form a right angle. The scanning lens is composed of one lens with magnification in mainscanning/subscanning directions. With such a construction, by providing an F-θ function and compensating for the vigration of the rotating polygon mirror, the number of lenses is mnimized, the manufacture and assembly/adjustment of the lens are simplified, and the number of manufacturing steps can be reduced.

8 Claims, 5 Drawing Sheets

FIG. 3
FIG. 4
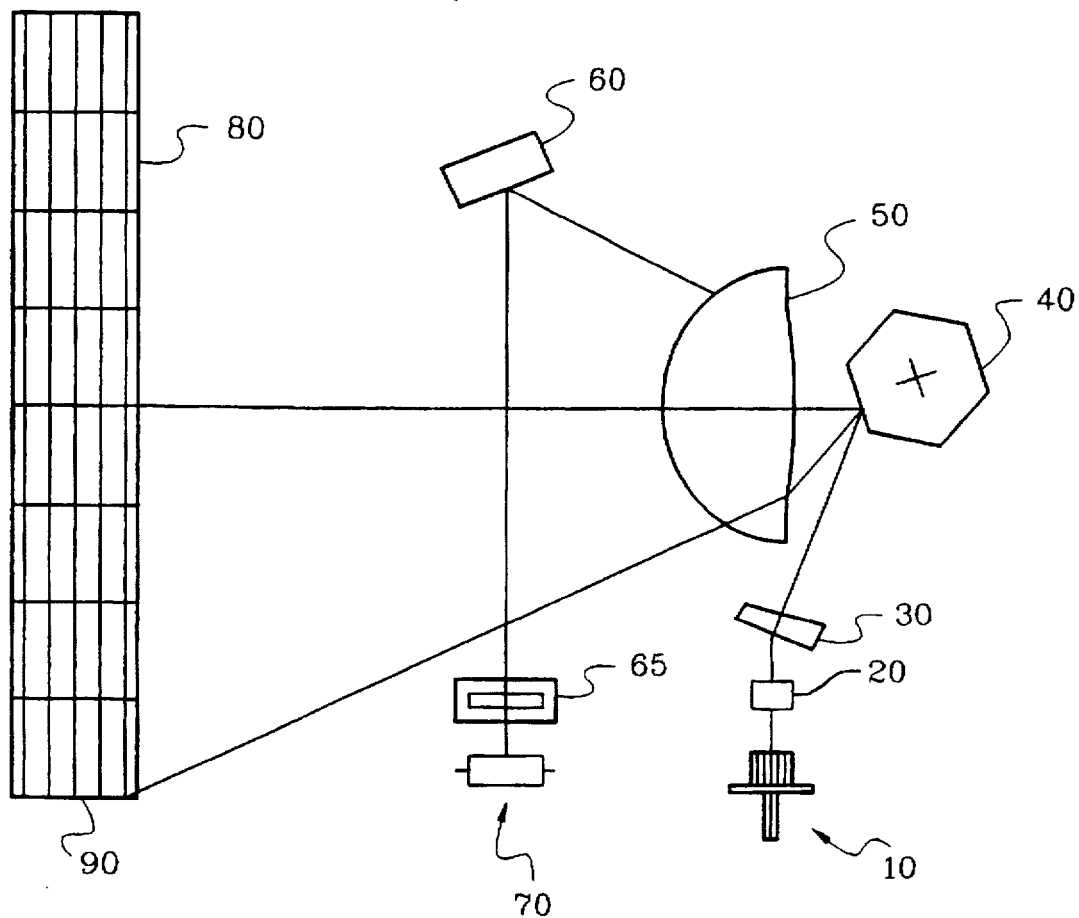
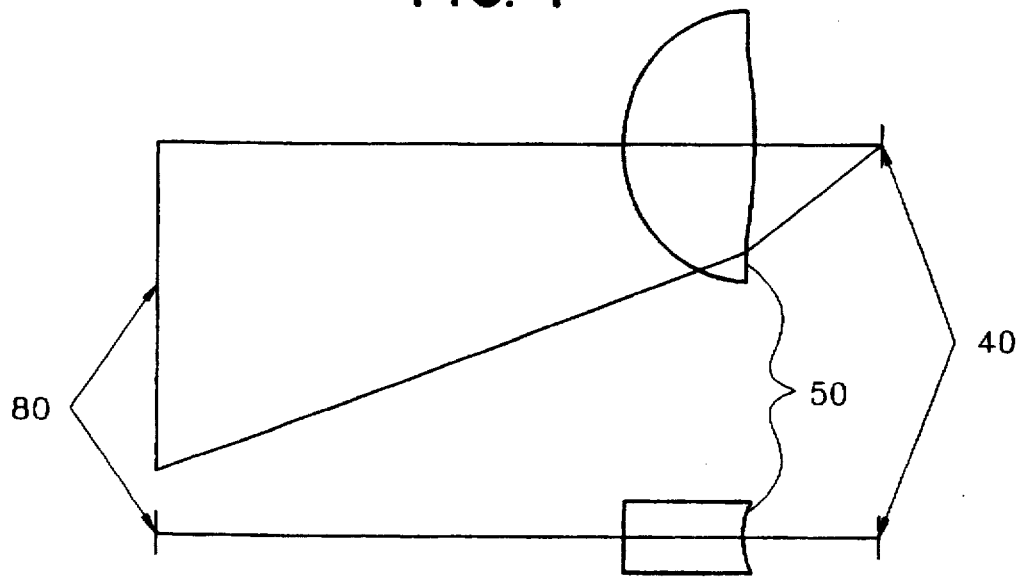

( L > l' )

1

OPTICAL SCANNING APPARATUS

BACKGROUND OF THE INVENTION

1. Field of the Invention

This invention relates to an optical scanning apparatus in optical equipment such as a laser beam printer and more particularly to an optical scanning apparatus having gives an F-theta function by means of one aspherical lens having a toric configuration and compensates for the vibration of a rotating polygon mirror.

2. Description of the Prior Art

Optical equipment using a laser, for example a laser printer, a laser scanning micrometer (LCM), pattern generator, etc., are known. Ordinarily, an optical system applying a laser is composed of a laser generator, a laser deflector, a laser scanning lens system, and a light receiving portion.

In addition, image forming apparatus such as copy machines, printers, etc., use an electronic photograph process method which frequently employs a monochromatic laser beam. Such apparatus is configured to form an electrostatic latent image onto a photosensitive object by directing a laser beam emitted from a laser beam emitting device such as a semiconductor laser diode to a polygon deflecting mirror rotating at high speed as parallel light through a collimator lens on a prism complex, and thereafter changing a reflection direction of the laser beam by the rotation of the deflecting mirror.

An example of such an optical scanning apparatus is disclosed in Japanese Patent Laid-Open Publication No. Hei 2 (1990)-161410 which will be hereafter explained as prior art with reference to FIG. 1.

Referring to FIG. 1, the laser beam emitted from a source of light 1 is scanned onto an image formation plane (photosensitive drum surface) 9 through of a rotationally asymmetric aspherical lens F-θ 6' serving to a scanning lens after the laser beam is reflected according to the rotation of a rotating polygon mirror 5 via a collimator lens 2, a slit 3, and a cylindrical lens 4.

Here, the scanning lens F-θ 6' for scanning the laser beam is composed of a first lens 6 with a rotationally symmetric axis whose first plane and second plane are a spherical plane or a flat plane and a second lens 7 whose third plane is the cylindrical lens and whose fourth lens is the rotationally asymmetric aspherical lens for correcting aberration.

In addition, the trace of the spot in the image formation plane 9 moves uniformly by the first plane and second plane of the scanning lens 6' when the rotating polygon mirror 5 is rotated with equal angles.

On the other hand, the effect of vibration of the rotating polygon mirror 5 is compensated for by the third cylindrical plane and fourth spherical plane of the second lens 7 located between the rotating polygon mirror 5, the first lens 6 and the image formation plane 9.

The prior art of FIG. 1 has the following problems.

First, the size of the lens must be large because the third plane and the fourth plane are located between the scanning lens and the image formation plane, whereby the lens may be greatly influenced by contraction/expansion due to humidity and temperature and the size of the entire optical system must be large.

Second, because the third plane and the fourth plane consist of the cylindrical lens and the aspherical lens respectively, even if they are manufactured by using a mould, the yield is likely to decrease when manufacturing and assembling the lens as it is difficult to properly align the two plane axes.

SUMMARY OF THE INVENTION

In view of the above problems, it is an object of this invention to provide an optical scanning apparatus which gives an F-θ function by means of one aspherical lens having a toric configuration and compensates for vibration of a rotating polygon mirror. The present invention facilitates the manufacture of the lens and reduces the number of steps needed to manufacture the apparatus.

It is another object of this invention to provide an optical scanning apparatus which provides a prism between a rotating polygon mirror and a laser diode as a light source so that the laser diode and an optical axis form a right angle wherein the prism has a function of a cylindrical lens, the assembly and adjustment of the lens is facilitated and the number of steps needed to manufacture the apparatus is reduced.

In order to accomplish the above objects, in accordance with this invention, in an optical scanning apparatus having a laser diode as a source of light, a collimator lens, a compound prism, a rotating polygon mirror, and a scanning lens system, the optical scanning apparatus is characterized in that the compound prism is located between the rotating polygon mirror and the laser diode so that the laser diode and an optical axis form a right angle, and the scanning lens is composed of one lens with magnification in mainscanning/ subscanning directions.

BRIEF DESCRIPTION OF THE DRAWINGS

This invention will be understood more fully from the detailed description given below and the accompanying drawings of the preferred embodiment of this invention, which, however, should not be taken to limit the invention, but are for only explanation and understanding.

In the drawings:

FIG. 3 is a top plan view of an optical scanning apparatus according to an embodiment of this invention.

FIG. 4 is a plane view and side view of a scanning lens according to an embodiment of this invention.

DETAILED DESCRIPTION OF THE PREFERRED EMBODIMENT

Figure 1:
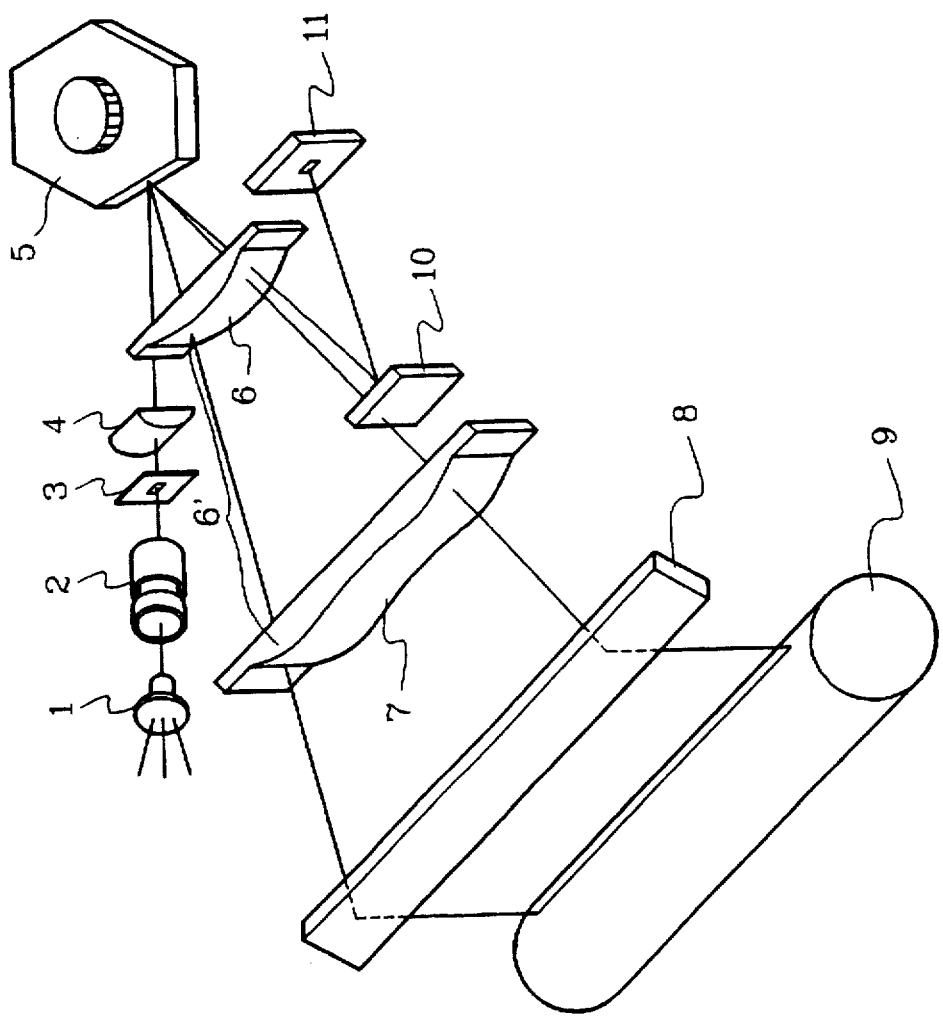
FIG. 1 is a perspective view of a conventional optical scanning apparatus.
Figure 2:
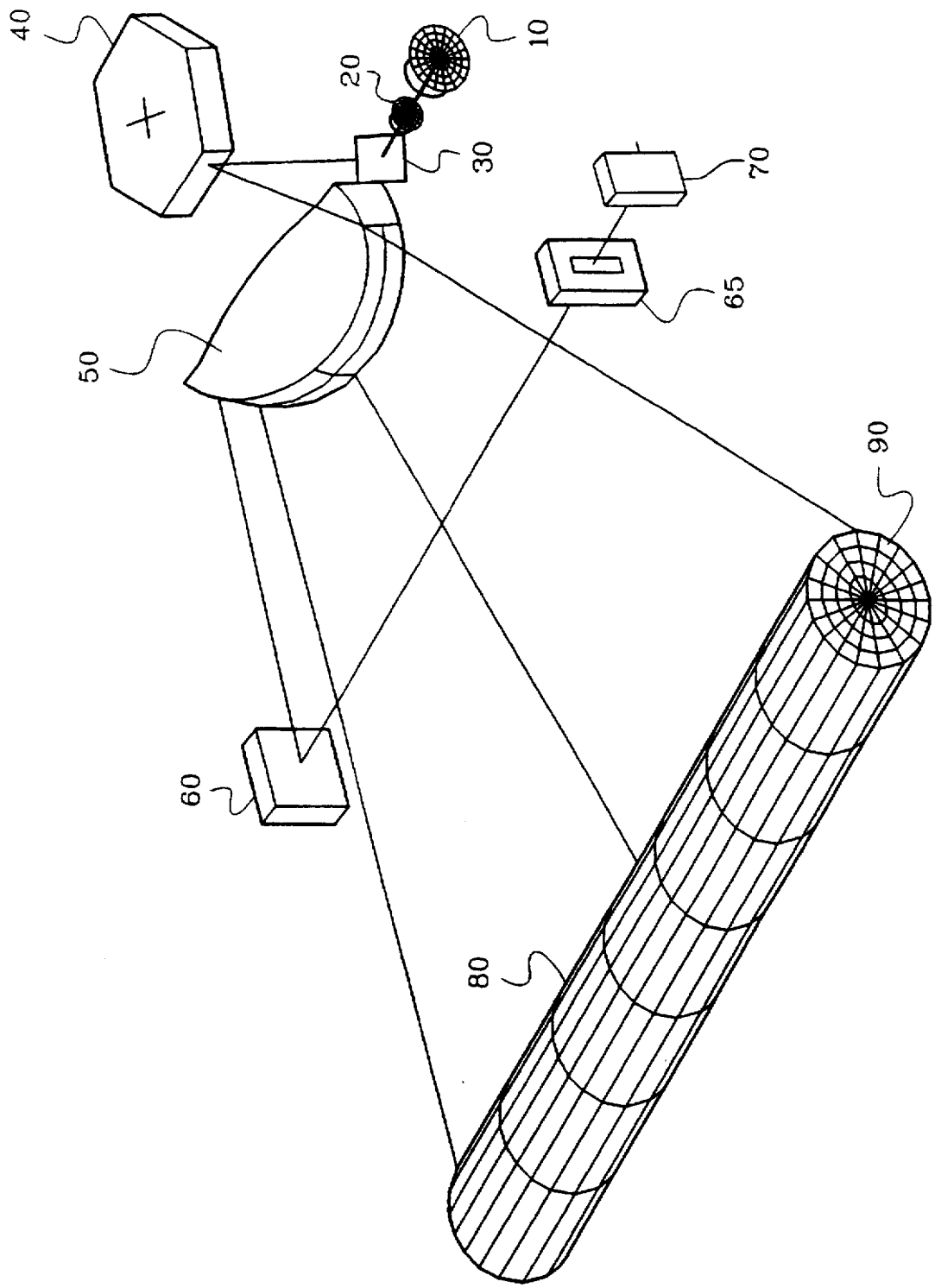
FIG. 2 is a perspective view of an optical scanning apparatus according to an embodiment of this invention.

Referring to FIGS. 2 and 3, an optical scanning apparatus is composed of a source of light 10 shown as a laser diode, a collimator lens 20, a deflecting prism and a cylindrical compound prism 30, a rotating polygon mirror 40, a scanning lens 50, a reflecting mirror 60, a slit 65, and a light detector 70. The reflecting mirror 60, the slit 65 and the light detector detect a portion of the scanned light in order to find a starting point of the light signal emitted from the source light 10.

The compound prism 30 is located between the rotating polygon mirror 40 and the source of light 10 so that the source of light and an optical axis form a right angle in order to facilitate the assembly and adjustment of the compound prism 30. Also, the compound prism 30 functions as a cylindrical lens.

Furthermore, the scanning lens 50 consists of one lens which is not a lens with different curvatures but one with identical curvatures symmetrical to a optical axis, and two planes of the lens have an aspherical shape.

In addition, the scanning lens 50 is formed to have, first, the function of an F-θ lens as an aspherical lens and second, the function of compensating for the deviation of a light beam by the vibration of the rotating polygon mirror 40 to scan a light beam as a spherical lens.

The scanning lens 50 consists of one lens having magnification in mainscanning/subscanning directions, while in mainscanning direction, scanning light in light deflecting direction so that the deflecting angle of the rotating polygon mirror 40 and the length of the scanning are proportioned linearly, and, in subscanning direction vertical to mainscanning direction, having the shape of a spherical lens.

Figure 5:
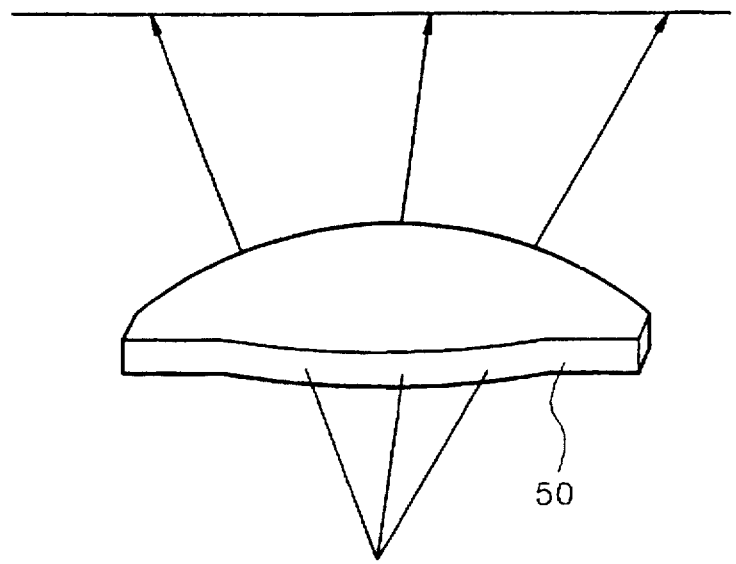
FIG. 5 is a perspective view of a scanning lens according to an embodiment of this invention.
Figure 6:
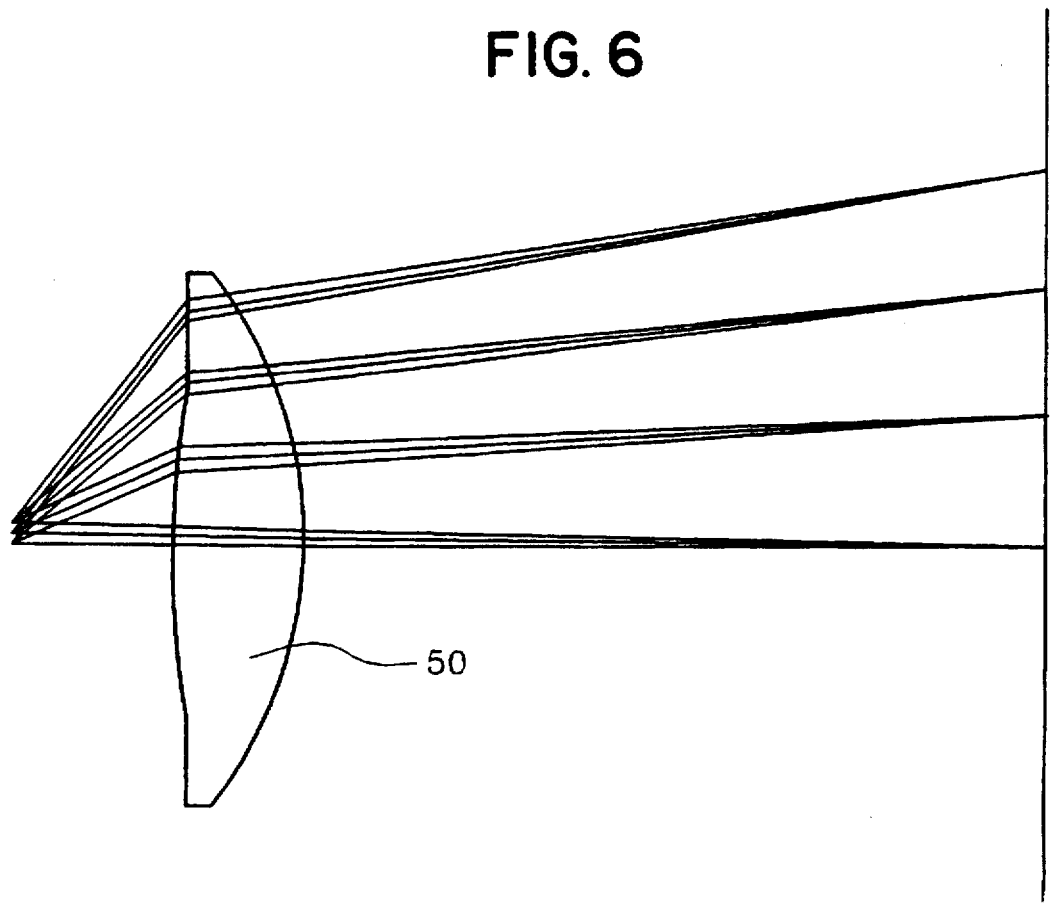
FIG. 6 is a plane view illustrating a light scanning state in a scanning lens according to an embodiment of this invention.
Figure 7:
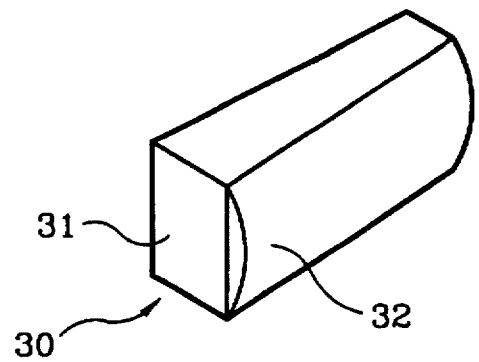
FIG. 7 is a perspective view of a compound prism according to an embodiment of this invention.

As shown in FIGS. 5 and 6, two lens planes in the mainscanning direction of the scanning lens 50 are configured to have conic constants and aspherical expanding coefficients up to an 8th order and two lens planes in subscanning direction use the spherical lens, and at least a conic constant of the aspherical lens having an axis-symmetry is configured to be (−) value.

In addition, two curvatures in the subscanning direction are coincidently concave in the direction of the rotating polygon mirror.

Furthermore, the ratio of the thickness of the scanning lens 50 to the distance to the first planes of the rotating polygon mirror 40 and scanning lens 50 lies in the range of 0.5 to 1.5.

Furthermore, the material of the scanning lens 50 is preferably poly (methyl methacrylate) (PMMA) or plastic of PC.

In addition, the lens curvatures of the lens direction in the scanning lens 50 are configured to have (+) and (−) signs respectively with respect to the rotating polygon mirror 40.

On the other hand, the curvature radius of the plane of the image formation plane 80 direction must be larger in absolute value than that of the plane of the rotating polygon mirror 40 direction of an axis-symmetric aspherical lens.

Figure 8:
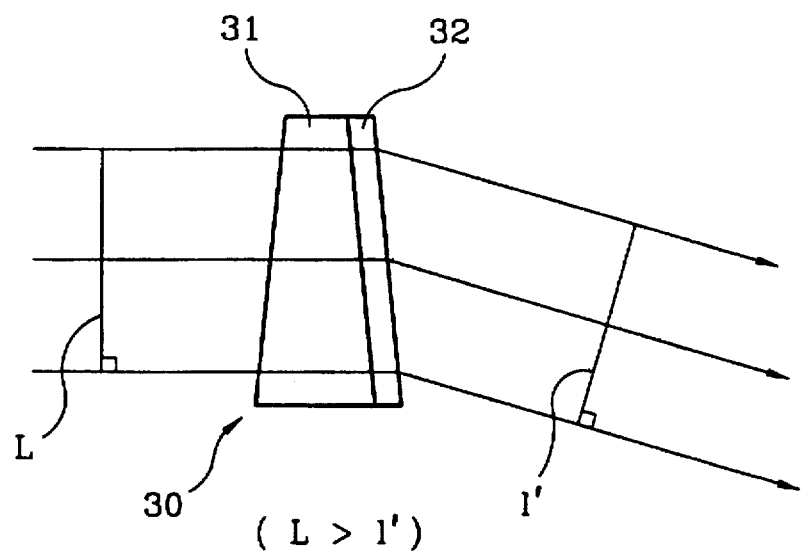
FIG. 8 is a plane view of a compound prism in mainscanning direction according to an embodiment of this invention.
Figure 9:
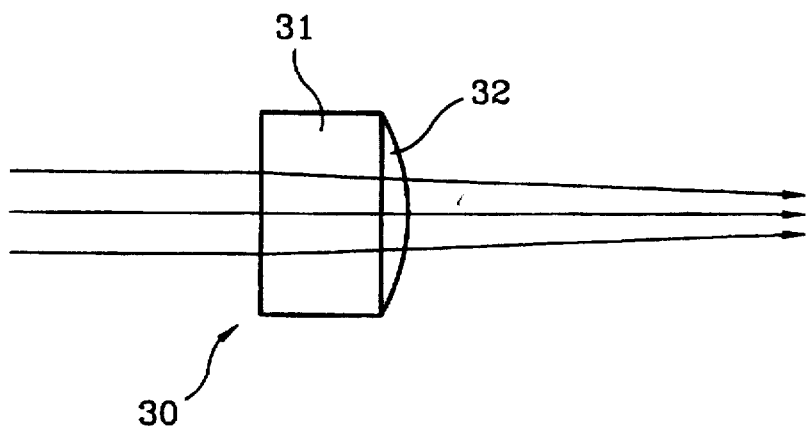
FIG. 9 is a side view of a compound prism in subscanning direction according to an embodiment of this invention.

With such a constructed optical scanning apparatus, the laser beam emitted from the source of light 10 becomes parallel by means of the collimator lens 20 and then becomes parallel in the mainscanning direction and receives in the subscanning direction perpendicular to the mainscanning direction by means of the deflecting prism and the compound prism 30 with the shape of the cylindrical lens. As will be evident from the description above, with additional reference to FIGS. 2 and 3, the compound prism 30 comprises a deflecting prism 31 and a cylindrical lens 32. The deflecting prism 31 receives a laser beam emitted from the collimator lens 20 and deflected toward the subscanning direction, as illustrated by FIG. 8. The cylindrical lens 32 emits the laser beam received by the deflecting prism 31 toward the rotating polygon mirror 40. The laser beam emitted toward the rotating polygon mirror 40 is converged toward the subscanning direction, as illustrated in FIG. 9.

The laser beam emitted from the collimator lens 20 is deflected toward the mainscanning direction while passing through the compound prism 30, and converged toward the subscanning direction. This enables a convenient layout of the scanning paths according to the deflection degree of the laser beam deflected toward the mainscanning direction. Also, emitting of the laser beam converged toward the subscanning direction serves to correct vibration of the surfaces of the rotating polygon mirror 40.

Thereafter, after this laser beam is reflected by the rotating polygon mirror 40 fixed to the axis of a spindle motor (not shown), it is image-formed on the image formation plane (photosensitive drum plane) 80 through the scanning lens 50 having the function of an F-θ lens in the mainscanning direction and the shape of the spherical lens in the subscanning lens.

On the other hand, by detecting a portion of the scanned light by means of the reflecting mirror 60 and the light detector 70, the starting point of the scanned light signal is obtained.

In addition, in order that the light parallel in the mainscanning direction and received in the subscanning direction may be simultaneously image-formed on the photosensitive drum plane 80, the aspherical lens with the toric shape has to have the contents of Table 1 described below. Also, the shape of the lens in the mainscanning direction and subscanning direction is shown in FIG. 4.

TABLE 1

| direction | surface | radius | distance (thickness) | refractive index | aspherical coefficient in the mainscanning direction | remark |
|---|---|---|---|---|---|---|
| subscanning direction | first surface | −20.85 | 25 | 1.49 | — | refractive index 1.49 based on PMMA plastic |
| | second surface | −12.38 | 121.6393 (distance to the image formation plane) | Air | — | |
| mainscanning direction | first surface | 200.1237 | | 1.49 | K −3.44.7707<br>A1 −0.442614E − 05<br>A2 0.4261371E − 09<br>A3 0.3168522E − 12<br>A4 0.1571949E − 15<br>A5 0.7879723E − 19<br>A6 0.9706250E − 22<br>A7 0.9087181E − 26 | "mm" unit of the radius |

TABLE 1-continued

| direction | surface | radius | distance (thickness) | refractive index | aspherical coefficient in the mainscanning direction | remark |
|---|---|---|---|---|---|---|
| | | | | | A8 −0.1772507E − 28 | |
| | second surface | 85.94 | | Air | K  1.70660 | |
| | | | | | A1 −0.4207116E − 05 | |
| | | | | | A2  0.3018561E − 08 | |
| | | | | | A3 −0.9097632E − 12 | |
| | | | | | A4 −0.5853751E − 15 | |
| | | | | | A5 −0.1391035E − 18 | |
| | | | | | A6  0.9146324E − 23 | |
| | | | | | A7  0.3487826E − 26 | |
| | | | | | A8  0.3091938E − 28 | |

As explained hereinbefore, according to the optical scanning apparatus of this invention, by giving an F-θ function by means of one aspherical lens with the toric shape made from plastic material which is capable of being injection-moulded and whose refractive index (n) is 1.48~1.6 and whose Abe constant is 30~60. Further, the present invention is able to compensate for the vibration of the rotating polygon mirror, by providing the prism between the rotating polygon mirror and the laser diode and the optical axis to form a right angle, and by giving the function of the cylindrical lens to the prism, minimize the number of lenses, simplify the manufacture and assembly/adjustment of the lens, and reduce the number of manufacturing steps process.

What is claimed is:

1. An optical scanning apparatus, comprising a light source emitting a beam of light, a collimator lens through which said beam is emitted, a rotating polygon mirror transmitting said beam toward an image formation plane;

a compound prism provided between the collimator lens and the rotating polygon mirror for converging the emitted beam toward a subscanning direction while deflecting the emitted beam toward a mainscanning direction; and an axis-symmetric aspherical lens provided between the polygon mirror and the image formation plane, and having a spherical surface in the subscanning direction.

2. The optical scanning apparatus according to claim 1, wherein the compound prism comprises a deflecting prism for deflecting the beam emitted from the collimator toward the mainscanning direction, and a cylindrical lens for converging the beam emitted toward the rotating polygon mirror in the subscanning direction.

3. The optical scanning apparatus according to claim 1, wherein the surfaces of the aspherical lens have conic constants and aspherical coefficients up to the 8th order.

4. The optical scanning apparatus according to claim 3, wherein at least one of the conic constants is (−) value.

5. The optical scanning apparatus according to claim 1, wherein lens curvatures of the surfaces of the axis-symmetric aspherical lens in the mainscanning and subscanning directions are convex and concave, respectively, towards the polygon mirror.

6. The optical scanning apparatus according to claim 1, wherein two lens surfaces in the subscanning direction use a spherical lens.

7. In an optical scanning apparatus having a laser diode as a light source, a collimator lens, a compound prism, a rotating polygon mirror, and a scanning lens system, the optical scanning apparatus is characterized in that:

the compound prism is located between the rotating polygon mirror and the laser diode so that the laser diode and an optical axis of the scanning lens system forms a right angle, and the scanning lens is composed of one lens with a first surface and a second surface and has power in mainscanning and subscanning directions wherein the scanning lens scans light in the mainscanning direction so that the deflecting angle of the rotating polygon mirror and the length of the scanning are proportioned linearly, and has the shape of a spherical lens in the subscanning direction vertical to the mainscanning direction;

wherein said first and second surfaces of said scanning lens have conic constants and aspherical expanding coefficients up to an 8th order in the mainscanning direction.

8. In an optical scanning apparatus having a laser diode as a light source, a collimator lens, a compound prism, a rotating polygon mirror, and a scanning lens system, the optical scanning apparatus is characterized in that:

the compound prism is located between the rotating polygon mirror and the laser diode so that the laser diode and an optical axis of the scanning lens system forms a right angle, and the scanning lens is composed of one lens with a first surface and a second surface and has power in mainscanning and subscanning directions wherein the scanning lens scans light in the mainscanning direction so that the deflecting angle of the rotating polygon mirror and the length of the scanning are proportioned linearly, and has the shape of a spherical lens in the subscanning direction vertical to the mainscanning direction;

wherein the said first and second surfaces of said scanning lens have curvatures in the mainscanning direction that are convex and concave respectively relative to the rotating polygon mirror.

* * * * *